UNITED STATES PATENT OFFICE.

JAMES C. ANDERSON, OF HIGHLAND PARK, ILLINOIS.

METHOD OF MAKING TIRES.

SPECIFICATION forming part of Letters Patent No. 637,692, dated November 21, 1899.

Original application filed June 14, 1899, Serial No. 720,514. Divided and this application filed July 21, 1899. Serial No. 724,683. (No model.)

*To all whom it may concern:*

Be it known that I, JAMES C. ANDERSON, a citizen of the United States, residing at Highland Park, in the county of Lake and State of Illinois, have invented certain new and useful Improvements in Methods of Making Tires; and I do hereby declare the following to be a full, clear, and exact description of the invention, such as will enable others skilled in the art to which it appertains to make and use the same.

My invention relates to a certain new and useful method of making tires upon wheels and repairing the same.

In an application filed by me on the 14th day of June, 1899, Serial No. 720,514, of which this is a division, I have shown and described an apparatus especially designed for carrying out my improved method, and reference is made to such application.

The object of my invention is to produce a tire having the properties and characteristics fully described in another pending application filed by me on the 14th day of June, 1899, Serial No. 720,516, and which tire is composed of asphaltum or bitumen as a base and upon which is built a tread-surface composed of asphaltum mixed with sand, corundum, or other similar comminuted material.

My present invention has for its object a method of forming the tire so that it shall be absolutely composite and without definable joints of any character whatever; and it consists in the steps hereinafter and in detail explained.

When the rim of a wheel has been provided with a suitable circumferential box or receptacle for the tire, as described in application Serial No. 720,516, above referred to, I deposit in said receptacle asphaltum or bitumen or other similar viscid material and to a depth or thickness equal to about one-third or one-half of the depth of the circumferential box or receptacle, and while this deposit is being made the wheel is rotated upon its axis, which may be a journal of any character or the axle of a vehicle. I prefer to deposit the asphaltum or equivalent in a thin continuing layer in substantially the manner that ribbon is wound upon a block, so that no joints will occur.

When the tire has been thus built up to the proper or desired height with asphaltum or equivalent material, I then in the same manner apply a composition of asphaltum, bitumen, or similar viscid material and sand or equivalent to complete the height or depth of the tire, and while applying the asphaltum and sand or equivalent I gradually increase the proportion of the latter to secure the proper degree of hardness for the tread-surface of the tire and to secure the proper retention of its form or profile and to enable it to resist undue indentation or abrasion in its contact with an ordinary roadway. The proportions of asphaltum and sand or equivalent can be best determined by adopting the formulæ employed in making asphaltum roadways, which vary according to the climatic conditions in localities where they are used.

In order to secure any desired design of cross-section profile of the tire, any suitable scraper or tool may be employed which will subserve the further purpose of controlling the thickness of the successive layers and removing any excess of material.

When a tire composed of the material described and made by my improved method becomes defaced or worn and it is desired to restore it to its original condition, I heat the exterior surface, and while so heated I engraft upon it asphaltum and sand or its equivalent in the manner already described.

Having described the manner in which I carry out my improved method, what I claim as new, and desire to secure by Letters Patent, is—

1. The herein-described method of making tires upon wheels, which consists in depositing fluid asphaltum or bitumen, and asphaltum or bitumen mixed with sand or its equivalent, within a suitable receptacle surrounding and secured to the rim of the wheel, while the wheel is rotated, and removing any excess of asphaltum and sand and giving to that which remains any desired design or profile.

2. The method herein described of forming tires on wheels provided with a tire-receptacle, which consists in revolving the wheel and during the rotation thereof depositing in the tire-receptacle a suitable quantity of asphaltum or bitumen while in a fluid condition, and superimposing upon such base while in a plastic condition a composition of asphaltum or bitumen and sand or its equivalent, gradually increasing the proportion of sand or its equivalent, substantially as hereinbefore set forth.

In testimony whereof I affix my signature in presence of two witnesses.

JAMES C. ANDERSON.

Witnesses:
N. CURTIS LAMMOND,
JNO. J. HARROWER.